March 28, 1961 E. H. BEISER ET AL 2,977,433
RADIO CLOCK MECHANISM
Filed Sept. 9, 1957 6 Sheets-Sheet 1
Fig. 1.
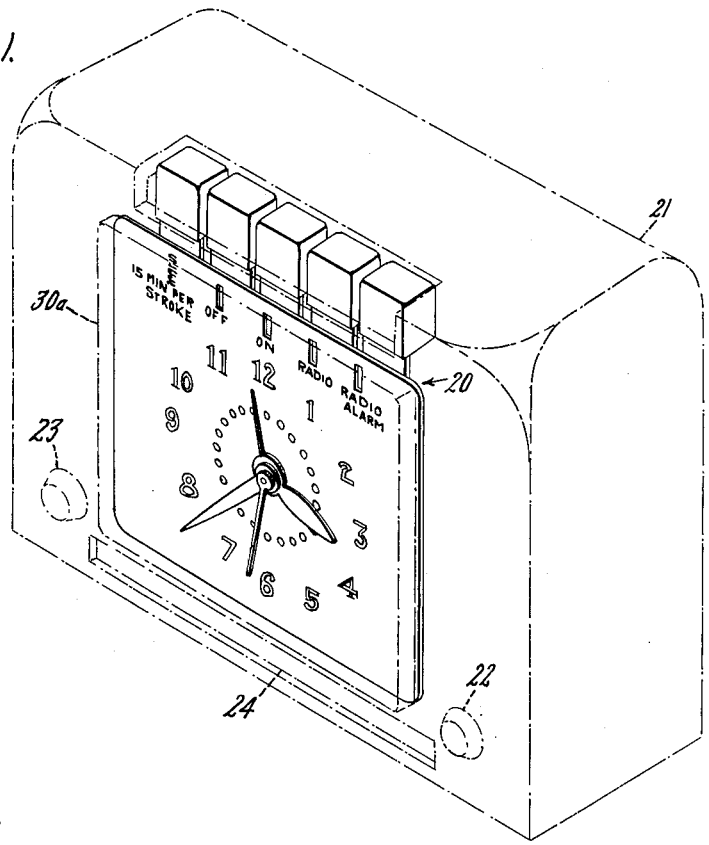
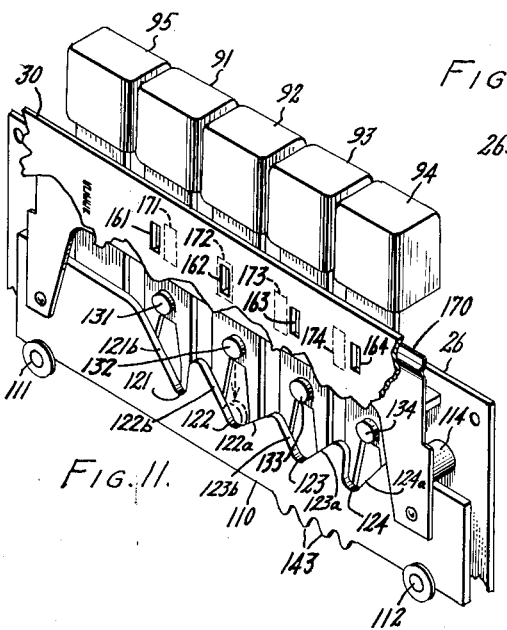
Fig. 11.
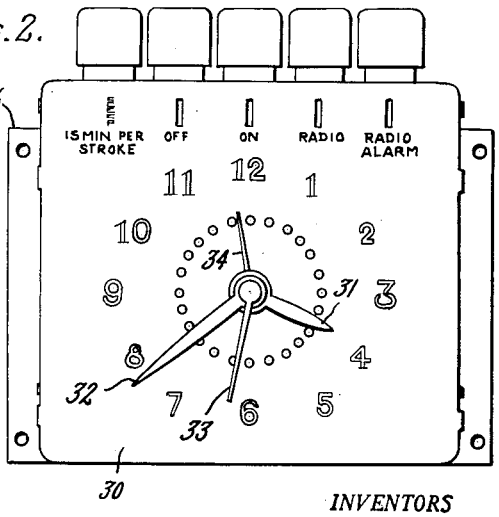
Fig. 2.
INVENTORS
ELMER H. BEISER
ROBERT H. EME
BY
ATTY.

March 28, 1961  E. H. BEISER ET AL  2,977,433
RADIO CLOCK MECHANISM
Filed Sept. 9, 1957  6 Sheets-Sheet 2
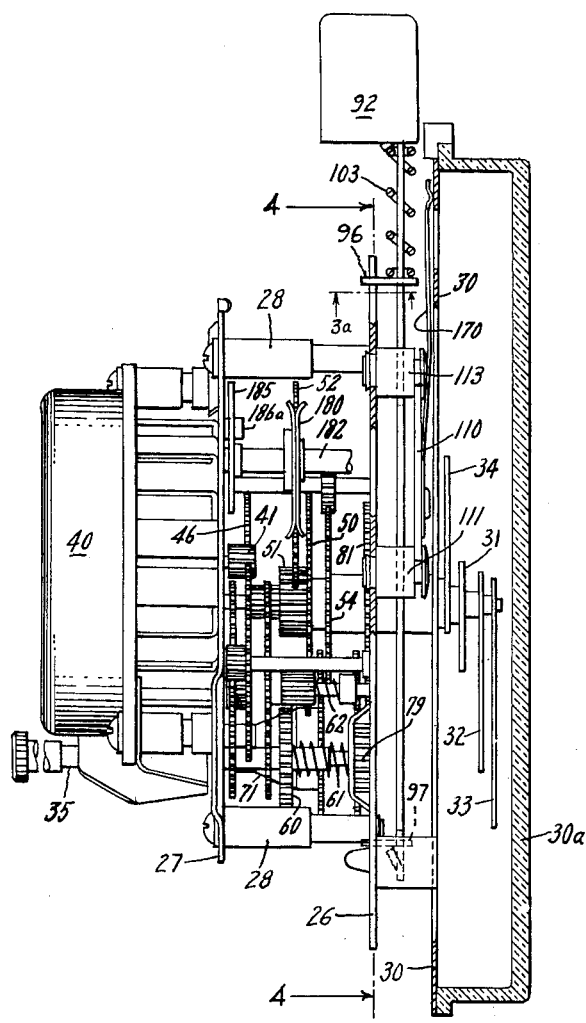
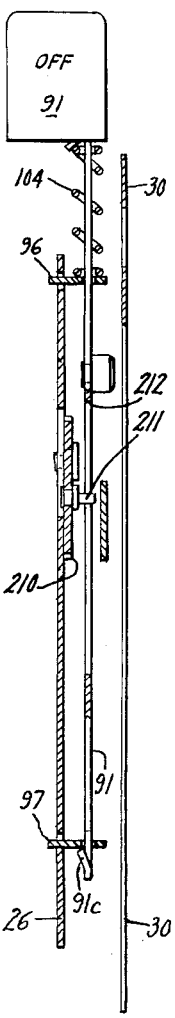
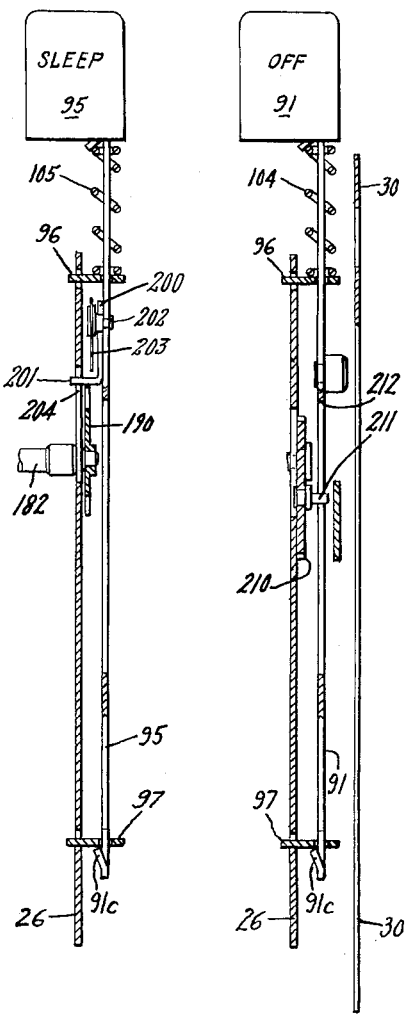
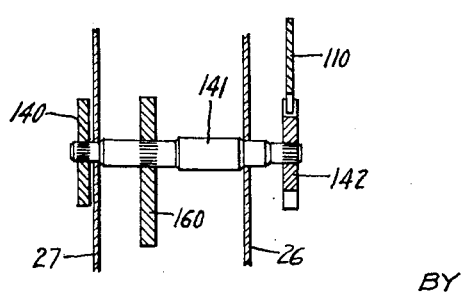
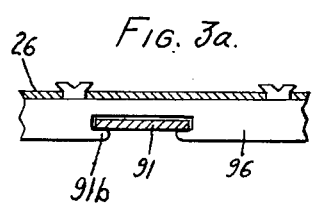
INVENTORS
ELMER H. BEISER
ROBERT H. EME
BY
ATTY.

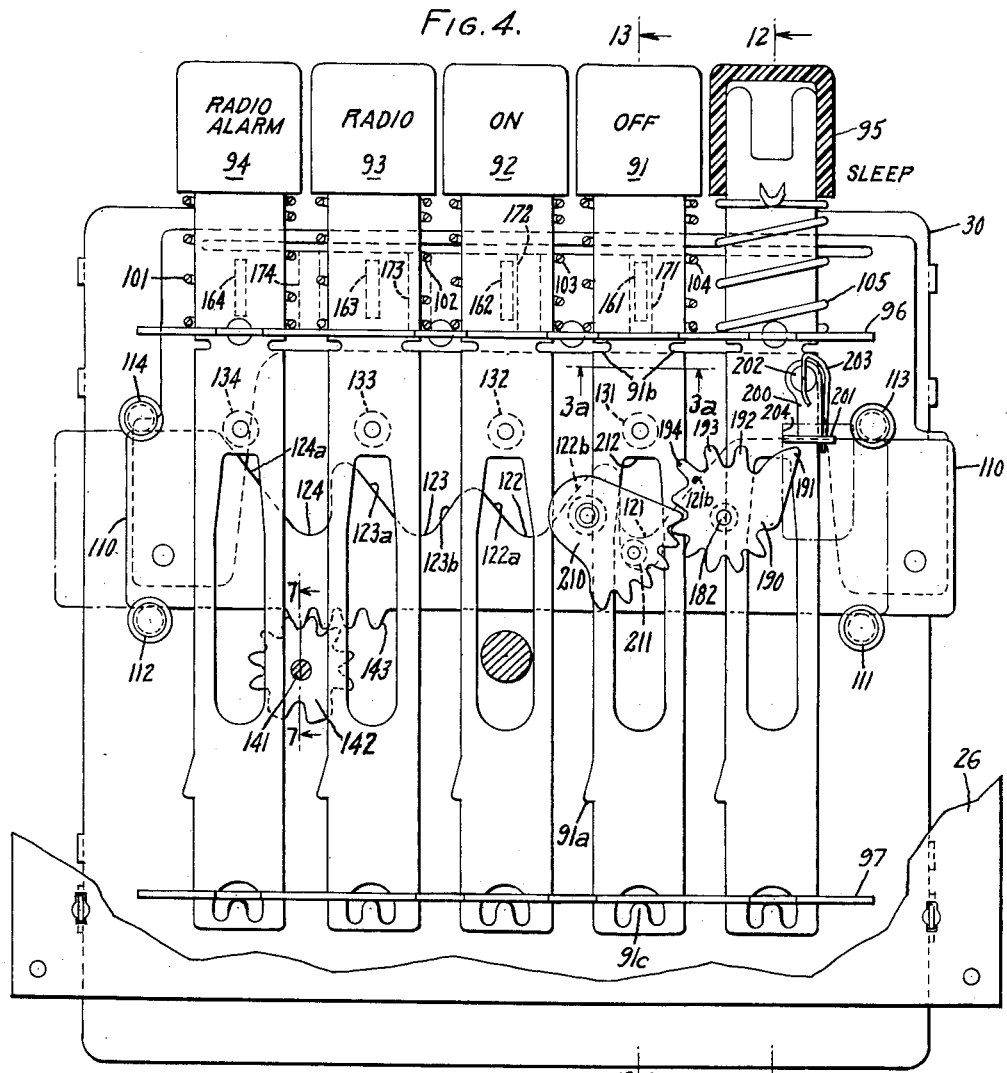

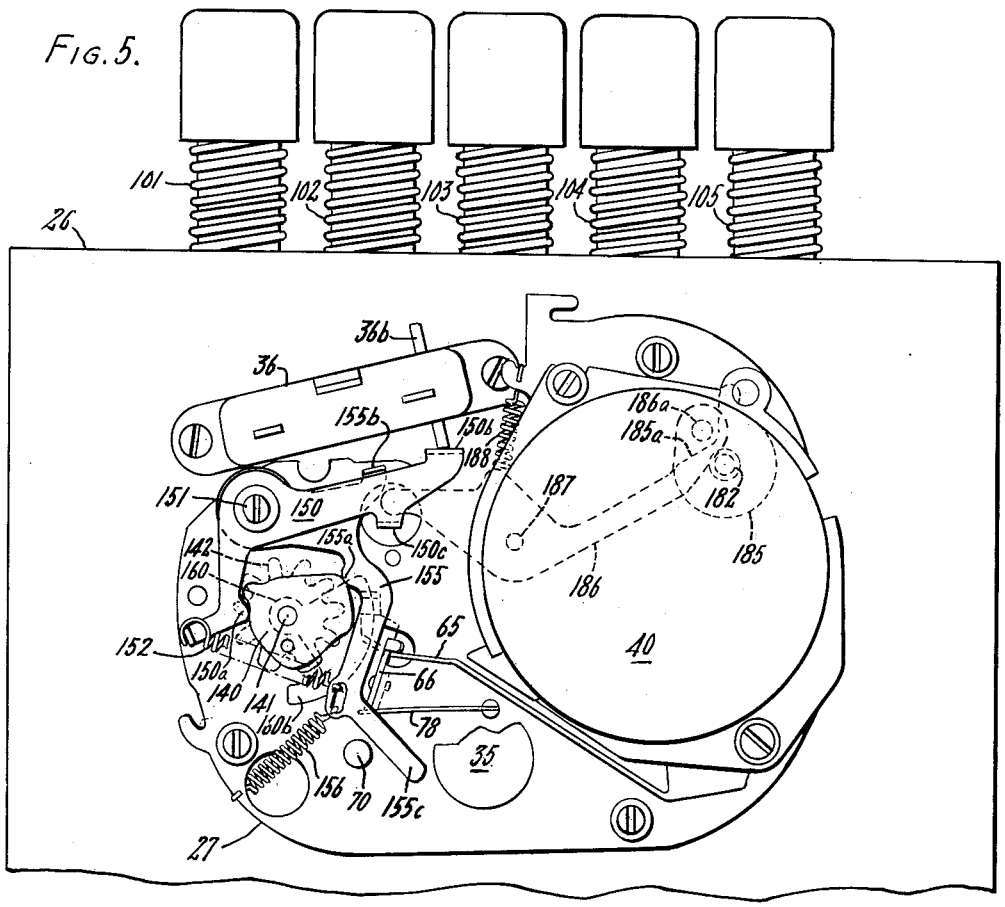

March 28, 1961

E. H. BEISER ET AL 2,977,433

RADIO CLOCK MECHANISM

Filed Sept. 9, 1957

INVENTORS
ELMER H. BEISER
ROBERT H. EME

BY

ATTY.

March 28, 1961 E. H. BEISER ET AL 2,977,433
RADIO CLOCK MECHANISM
Filed Sept. 9, 1957 6 Sheets-Sheet 6

OFF

RADIO ALARM SET SW. OFF

ON

RADIO ALARM TRIPPED SW. ON BUZZER FREE

RADIO SET SW. OFF

FIRST TRIP RADIO ON

RADIO TRIPPED SW. ON

SECOND TRIP RADIO ON ALARM ON

INVENTORS
ELMER H. BEISER
ROBERT H. EME
BY
ATTY though appearance is that of a well designed two-knob radio free of clock complications.

United States Patent Office 2,977,433
Patented Mar. 28, 1961

2,977,433
RADIO CLOCK MECHANISM

Elmer H. Beiser, Peru, and Robert H. Eme, Chicago, Ill., assignors to General Time Corporation, New York, N.Y., a corporation of Delaware Filed Sept. 9, 1957, Ser. No. 682,975

13 Claims. (Cl. 200—38)

Clock radios providing for a number of different modes of operation have been accepted by the buying public; however the devices have been complicated to operate with numerous knobs, and reference must usually be had to an instruction manual or the like for the setting procedure which usually differs widely as between the various makes and models. The reaction of the average individual to such complexity is to throw up his hands, as a result of which clock radios have not enjoyed full popularity, and after purchase, are not operated in a way to take full advantage of the flexibility intended by the engineers and designers.

Accordingly it is an object of the present invention to provide a clock assembly for a clock radio which includes a novel push button control arrangement enabling the device to be manipulated for its various modes of operation naturally and instinctively without special instruction or recourse to operating manuals. It is a related object to provide a clock radio in which there are only two projecting knobs, a radio station selector and a volume control, all other functions being selected by a novel push button arrangement providing four modes of operation in addition to the "off" condition, namely, "on," "radio," "radio-alarm," and "sleep," so arranged that changes from one mode to another may be made directly, each depression of a push button cancelling out the previous instruction and without necessity for following any particular order or procedure.

It is another object of the invention to provide a novel push button control arrangement for an electric clock radio which may be adjusted by "feel," without visual checking, making the device particularly well suited for bedside use or for operation in darkness. In this connection, it is an object to provide a control arrangement which may be operated by a simple bottoming push, downward in the preferred embodiment, without any particular care or attention and without danger of going beyond a desired point of setting. The device is, consequently, well adapted to use by children.

It is a further object related to the foregoing to provide a novel push button control for the "sleep" function in which the automatic delay, before shut off, may be set by the corresponding push button in definite increments, for example, 15 minutes per push, by "feel" and without reference to any visual index.

It is a still further object to provide an arrangement which is flexible, allowing for change of mind, and in which any remaining time in the "sleep" delay cycle may be wiped out by the simple expedient of pressing the "off" button.

It is still another object to provide a novel push button control arrangement which, in addition to its mechanical functioning makes possible a new concept in the artistic design of clock radios, not only reducing the clutter and unsightliness of the miscellaneous projecting knobs usually required but enabling the push buttons to be nested within the outline of the housing and forming a smooth continuation of the surfaces thereof so that the overall appearance is that of a well designed two-knob radio free of clock complications.

In one of its aspects, it is an object of the invention to provide a novel display provision in which the selected mode of operation is clearly but unobtrusively indicated on the clock dial thereby notifying the operator of the condition to which the clock has been previously set.

It is another object to provide a push button assembly which is distinguished by straight line action of the controls in combination with clock mechanism in which rotational settings of control shafts determine the mode of operation. It is a related object to provide a novel means for converting the straight line motion of a series of push buttons having equal stroke to the angular phase position of rotary setting elements. It is another object, also related to the above, to provide a push button operating means which is adaptable to use with various designs of conventional radio clock mechanisms without any substantial change in the latter thus effecting substantial economies in manufacture.

Moreover, it is an object to provide a novel push button linkage which possesses all of the above advantages but which is nevertheless extremely compact, and which may be sandwiched in a flat space on the order of a quarter of an inch in width between the clock frame and the clock dial.

Finally, it is an object to provide a clock assembly which includes a minimum number of parts and in which all of the parts may be easily manufactured and assembled without exceeding the tolerances usually applicable to clock manufacture.

Other objects and advantages of the invention will become apparent upon reading the attached detailed description and upon reference to the drawings in which:

Figure 1 shows, in perspective, a clock assembly constructed in accordance with the present invention and as integrated into the cabinet of a clock radio.

Fig. 2 is a front elevation of the clock assembly shown in Fig. 1.

Fig. 3 is a side elevation of the clock assembly shown in Fig. 2 with certain portions in section to reveal the details of construction.

Fig. 3a is a fragmentary section taken along the line 3a—3a in Fig. 3.

Fig. 4 is a transverse section showing the push button linkage and taken along the line 4—4 in Fig. 3.

Fig. 5 is a back view of the clock assembly.

Fig. 7 is a fragmentary section taken along the line 7—7 in Fig. 4.

Figs. 8a–8f inclusive are a series of stop motion views showing the position of the setting cam and its associated levers under various conditions of operation.

Figs. 9a, 9b and 9c show the operation of the alarm trip mechanism with the mechanism in the "radio" condition.

Figure 10A:
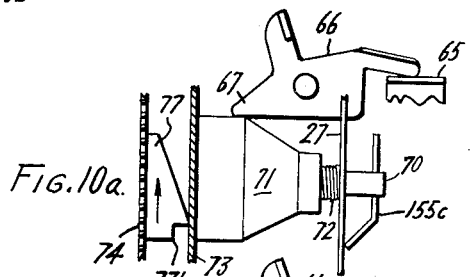
Figure 10B:
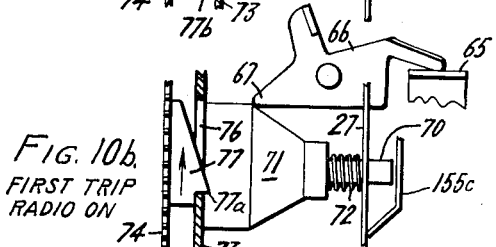
Figure 10C:
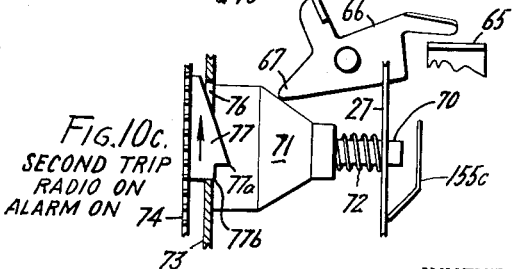

Figs. 10a, 10b and 10c are similar to Figs. 9a–9c but with the mechanism in the "radio-alarm" condition.

Fig. 11 is a fragmentary perspective showing the operation of the function indicator which indicates which of the group of push buttons has been previously depressed.

Fig. 12 is a fragmentary section through the plunger associated with the "sleep" push button and taken along the line 12—12 in Fig. 4.

Fig. 13 is a fragmentary section through the plunger associated with the "off" push button and taken along the line 13—13 in Fig. 4.

Figs. 14a, 14b and 14c are fragmentary stop motion views showing the "sleep" push button in its normal or inactive position and showing the result of two successive actuations thereof.

While the invention has been described herein in connection with a preferred embodiment, it will be understood that we do not intend to limit the invention to such embodiment but intend to cover such alternative or equivalent constructions as fall within the spirit and scope of the appended claims.

Turning now to the drawings, Figure 1 shows a clock assembly 20 integrated into a radio cabinet 21 having a tuning knob 22 and a volume knob 23. Since the cabinet may take many forms, it is simply indicated in dot-dash outline and the tuning dial, shown at 24 as of the slide rule type, may similarly take any form conventionally used in radios of this type. The clock 20 includes a frame employing a front frame plate 26, and a rear frame plate 27 spaced apart by suitable pillars 28. Arranged parallel to the front frame plate and spaced forwardly a short distance from the latter, for a purpose which will become clear, is a clock dial 30 having hour, minute and second hands 31–33 respectively and an alarm setting hand 34. Covering the dial 30 is a suitable transparent lens 30a which may be made of plastic or the like. Extending rearwardly from the clock frame is an adjusting stem 35. This stem, extended so as to be accessible at the back of the radio, is employed as will be seen, for the purpose of setting the alarm mechanism and, when pushed inwardly, to set the time indicated by the hands 31, 32.

Mounted on the frame of the clock and under the control of the clock mechanism for providing various modes of operation is a switch 36 having contacts 36a and a plunger 36b. It will be understood that the terminals of this switch, indicated at 37, 38, are connected in series with the current supply to the radio.

*Timing train and alarm mechanism*

Figure 6:
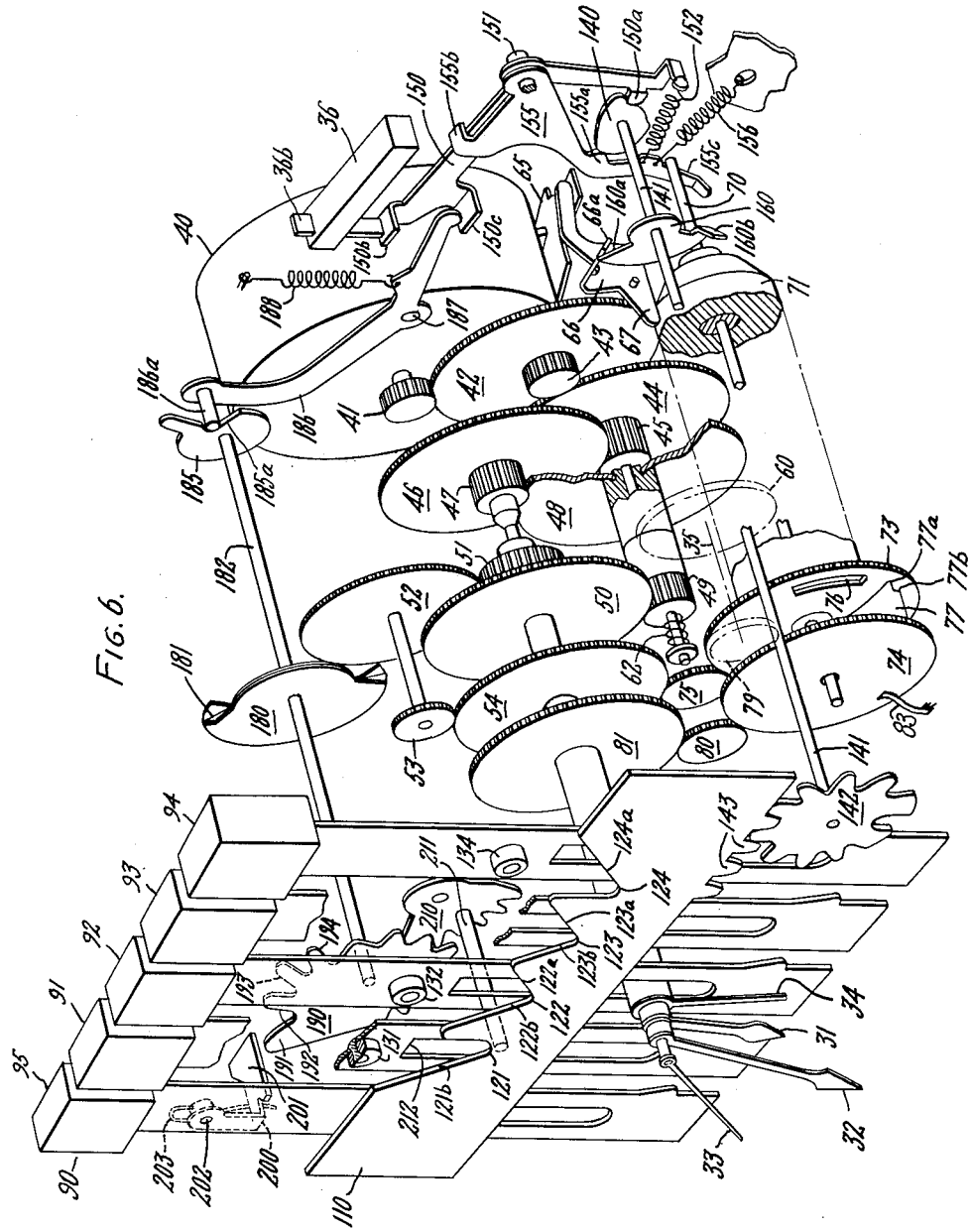
Fig. 6 is a perspective of the clock assembly distorted as necessary to bring out the relationship between the operating elements and with certain parts omitted to simplify understanding.

Prior to discussing the control mechanism toward which the invention is primarily directed, it will be helpful to have rather clearly in mind the timing train and alarm mechanism which is per se similar to mechanisms used in conventional radio clocks. In Figure 6 of the drawings, the mechanism is shown in the form of a partly distorted perspective, and the locations of the parts and the shape of some of them have been altered to the extent necessary to bring out as clearly as possible the manner in which the parts are related to, and cooperate with, one another. Reference may also be had to Figs. 4 and 5 which show the side and rear views respectively of the assembly.

Turning to the timing train, the driving motor 40 is of the conventional synchronous type. The pinion 41 thereof meshes with a gear 42 mounting a pinion 43. The latter drives a gear 44 having a pinion 45 which meshes with a second hand gear 46 connected to the second hand 33 of the clock, which rotates at 1 r.p.m. Further gear reduction for driving the minute hand is achieved by a minute hand pinion 47 on gear 46 which meshes with a gear 48 having a pinion 49. The latter meshes with the minute hand gear 50 connected to the minute hand 32. Still further reduction for driving the hour hand is achieved by a minute hand pinion 51 meshing with a gear 52 having a pinion 53, which, in turn, engages the hour hand gear 54, the shaft of the latter being brought out to the hour hand 31 at the clock face.

For the purpose of setting the clock hands, a setting pinion 60 is provided at the end of the stem 35. This pinion is meshed with the teeth of the minute hand gear 50 by pushing the stem 35 inwardly against the force of a spring 61. To provide for slippage between the minute hand gear 50 and the rest of the driving train during the setting operation, the pinion 49 which engages the gear 50 is not rigid with respect to its gear 48 but frictionally coupled to it, with friction being provided by a spring 62. It will be apparent that once the hands have been set, the synchronous rotation of the driving motor will maintain the clock "on time."

In carrying out the present invention, a two-step alarm mechanism is provided, the first step being utilized in one of the modes of operation of the present device to turn on the radio as discussed more fully below and the second step being employed to sound a buzzer alarm approximately 10 minutes thereafter. The alarm is sounded by a well-known buzzer armature 65 forming an integral part of the motor 40. The armature 65 is normally held in a retracted and inoperative position by an alarm release lever 66. For the details of construction of the arm release lever 66, reference is made to Fig. 10a in addition to Fig. 6. Here it will be noted that the opposite end 67 of the lever 66 is normally blocked against rotation by the alarm trip mechanism. This mechanism includes a plunger or trip staff 70 having a conical cam 71 biased to the left (as viewed in Fig. 10a) by a coil spring 72.

For the purpose of causing the trip staff 70 and cam 71 to move endwise for tripping at a selected time, they are connected to an axially movable drop-off gear 73 which cooperates with a detent gear 74. The drop-off gear is constantly rotated on a twelve hour cycle by meshing with a pinion 75 which in turn meshes with the hour hand gear 54. The drop-off gear 73 has a drop-off opening 76 which registers with a detent 77 secured to the detent gear 74. The detent 77 has a first drop-off point 77a which, as will later appear, serves to operate the radio switch and a second drop-off point 77b which serves to operate the buzzer alarm.

With regard to operation of the trip mechanism, passage of time causes the drop-off gear 73 to be gradually rotated around to the point where the drop-off point 77a on the detent "clears" the edge of the opening 76 whereupon drop-off occurs as shown in Fig. 10b. This produces movement of the trip staff 70 but is ineffective to turn on the buzzer alarm. Upon passage of approximately 10 minutes additional time, drop-off occurs at point 77b on the detent causing the cam 71 to be moved downwardly with respect to the lower end 67 of the armature release lever 66. This frees the lever for rotation (Fig. 10c) into an out-of-the-way position under the urging of a spring 78 anchored to the rear frame plate of the clock which releases the armature 65 for the sounding of an audible alarm.

In order to vary the phasing of the detent gear 74 with respect to the drop-off gear 73, the setting stem 35 is provided at its end with a pinion 79 which engages the gear 74. So that the setting of the alarm mechanism may be visible to the user of the clock, the detent gear 74 is coupled to the alarm setting hand 34 via an idler pinion 80 and a setting gear 81. In order to insure that the setting is maintained in spite of the drag on the detent gear 74, the latter is frictionally secured by means of a spring 83.

With the construction of the timing train and alarm mechanism in mind, attention may be given now to the means for controlling the switch 36 for various modes of operation. In the following discussion, portions of the control mechanism will be separately discussed for convenience and ease in understanding, but it will be understood that the invention resides partly in the manner in which such portions are related to, and cooperate with, one another.

*Push button plunger arrangement*

In accordance with the present invention, novel means including a set of push button plungers arranged between the dial and the frame of the clock are provided for controlling the radio switch in conjunction with the clock and its alarm mechanism to produce several modes of radio operation. Referring to the preferred embodiment shown in the drawings, the set of push buttons indicated at 90 is located directly above, and adjacent to, the clock dial. Individual ones of the buttons are numbered 91-95 and control functions as follows:

91—Off
92—On
93—Radio
94—Radio-Alarm
95—Sleep (delay)

The plungers each consist of pieces of flat strip stock arranged edge to edge and are mounted for vertical sliding movement in upper and lower guide members 96, 97 respectively. The latter are suitably secured, as by riveting, to the front frame plate 26 of the clock. Return springs 101–105 respectively surround each of the plungers and, bearing against the top guide member 96, urge all of the plungers into an upwardly extended position in which they are alined with one another.

In order to understand the manner in which each of the push button plungers is constructed and mounted in the guides, the "off" plunger 91 will be selected as representative. First of all, to define the inward limit of movement against the force of the return spring, the plunger 91 has a lug 91a formed on its edge and which engages the lower guide 97. In order to facilitate insertion of the plunger 91 into its captive position, the upper guide 96 is formed with a series of open notches with over hanging sides as shown in Fig. 3a. To "clear" the overhang, the plunger 91 is notched out at its lateral edges as indicated at 91b. Thus, in assembling the plunger 91 in its guides, the lower tip is entered into an appropriate opening in the lower guide member 97 following which the notches 91b are registered with the upper guide member 96 and the plunger is seated therein. Following this, the plunger is pushed endwise an additional amount, moving the notches 91b out of register. The plunger 91 is then locked against retraction by a lug 91c integral with the lower end of the plunger. The latter is bent out of the plane of the plunger (Fig. 3) so that it strikes the lower edge of the lower guide. The result is to produce a free sliding movement within positively defined limits. Corresponding features are included in each of the plungers comprising the assembly.

In accordance with one of the features of the invention, a slidable control member is provided arranged flatly adjacent to the plungers and a novel cam arrangement is employed between the plungers and the slidable member for camming the member endwise into defined positions depending upon which push button plunger has been depressed. In the present embodiment, the slidable member, which will be referred to as a slide cam, is indicated at 110, the edges being engaged by grooved studs 111–114 suitably riveted to the clock frame. Formed on the upper edge of the slide cam 110 are cam valleys 121–124 respectively. Each of these valleys is bounded by cam surfaces, the surfaces effective to move the cam slide to the left being indicated by the subscript a and surfaces which are effective to move the plunger to the right being indicated by the subscript b. For engaging the cam surfaces 121–124 cam followers 131–134 are provided on the plungers 91–94 respectively in the form of forwardly projecting studs lying in the plane of the slide cam. (Fig. 11.)

Prior to describing the camming operation, it is to be noted that the cam valleys 121–124 are more closely spaced than the cam followers 131–134 which cooperate with them. Stated another way, the cam valleys are incrementally offset with respect to their cam followers so that incremental movement of the slide cam is produced when the push button plungers are successively depressed. For example, pressing the "on" push button plunger causes the cam follower 132 thereon to move downwardly to the dotted position where it engages the cam surface 122a. Additional movement causes the slide cam to be cammed or crowded to the left from the "off" position in which the slide cam has been shown. It will, moreover, be apparent that pressing the "radio" plunger 93 causes the slide cam to be engaged at the cam surface 123a and crowded additionally to the left through another incremental movement. Finally, pressing the "radio-alarm" plunger 94 completes the leftward movement by causing the cam follower 134 to bottom in the cam valley 124. While the operation has been discussed assuming that the plungers 92–94 are pressed in succession, it will be apparent that any one of the plungers may be pressed individually and will cause the slide cam to be moved endwise to a corresponding and unique position. Moreover, the push button plungers may be pressed in the opposite order at which time the "b" surfaces will be effective to back up the slide cam to the right. Thus pressing the "off" plunger 91 causes the cam follower 91 to engage the cam surface 121b so that the slide cam is crowded to the right until the cam follower is bottomed in the valley 121, thus restoring the slide cam to its retracted or "off" position.

*Rotary control cam arrangement*

Figure 8A:
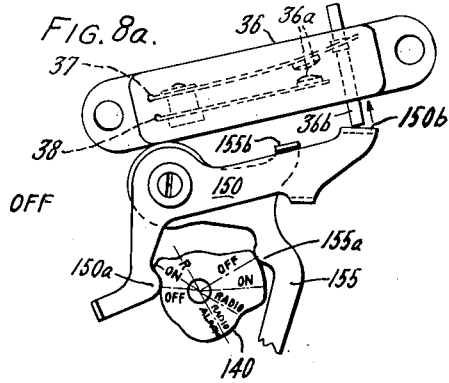

In accordance with one of the features of the invention, a rotary control cam is provided within the clock frame for controlling the operation of the radio switch and a rack and pinion connection is made between the slide cam and the rotary control cam so that the latter occupies a defined position corresponding to the "active" plunger. Referring to Figs. 5, 6 and 7, the rotary control cam 140 is mounted on a shaft 141 which extends through the back plate of the clock frame. The shaft 141 is also extended through the front plate of the clock frame, carrying at its forward end a sector pinion 142 which engages a rack 143 formed on the lower edge of the slide cam 110. As a result of this connection, the rotary control cam 140 is caused to occupy four different positions, depending upon the push button plunger which is depressed, the control cam being shown in Figs. 5 and 6 in the "off" position and in Figs. 8b, 8c and 8e in its successively advanced positions for producing the different modes of operation. In Figs. 8a–8c, the control cam is labeled to show the positions which it occupies at each setting relative to its associated levers.

For the purpose of operating the switch 36, a switch lever 150 is provided mounted on a pivot 151. This lever is in the shape of a dog-leg having a cam follower tip 150a at its left hand end and a bent over switch operating tab 150b at its right hand end which engages the plunger 36b of the switch 36. The lever 150 is urged in a counterclockwise direction by means of a coil spring 152 which is anchored to the lower or left hand end of the lever. In the present device, the switch is so arranged that the contacts 36a therein are normally closed when the plunger 36b is extended. Pressing the plunger, however, causes the contacts to separate thus turning the radio off.

In addition to the lever 150, a second lever 155 is provided pivoted at 151 and having a cam follower tip 155a which rides on the opposite side of the rotary control cam 140. This lever is provided with a bent-over tab 155b which overlies the upper edge of the switch lever 150 thereby controlling the ability of the lever 150 to move in the upward or "switch off" direction. The lever 155 is biased into engagement with the control cam 140 by means of a spring 156 which is anchored to the clock frame. In the "off" position of the mechanism illustrated in Figs. 5 and 6, the cam follower tip 150a occupies a "low" position on the cam while the cam follower tip 155a occupies a "high" position, thereby permitting the switch lever 150 to be rocked around to its counterclockwise position under the urging of the spring 152, moving the switch plunger up and turning the switch off.

In the following paragraphs the effect of rotating the control cam 140 through its successive positions will be discussed in connection with Figs. 8a–8f respectively.

Taking the "on" position next, it will be assumed that the "on" push button plunger 92a has been depressed thereby moving the slide cam to the left through one step (as viewed in Fig. 4) and causing one step rotation of the rotary control cam 140. Shown in Fig. 8b, such movement has no effect upon the switch trip lever 155 since the effective cam radius does not change between the "off" and "on" positions. However, the switch lever 150 is caused to ride up on the high portion of the cam, thereby rocking the lever clockwise, i.e., downwardly with respect to the switch plunger. The accompanying movement of the switch plunger brings the contacts together and turns the radio on.

To continue the description, the effect of pressing the "radio" button 93 will next be discussed. This causes the slide cam to be moved additionally to the left and causes the rotary control cam 140 to undergo a step of movement in a counterclockwise direction so that the cam followers on the levers engage the control cam 140 at the points designated "radio." The radio function is employed to turn the radio on at a selected time in the morning in lieu of the usual alarm. Consequently, it is assumed in the discussion which follows that the alarm mechanism has been appropriately set to trip by rotation of the setting stem 35 and at a time indicated on the face of the clock by the indicating pointer 34. It will be recalled in connection with the description of the alarm trip mechanism that under such conditions the drop-off gear 73 rides on the tip 77a of the detent 77, thereby temporarily maintaining the trip staff 70 in a position outwardly extended with respect to the back frame plate of the clock. In carrying out the invention, the switch trip lever 155 is provided with an extension 155c which engages, and is blocked by, the trip staff 70 of the alarm mechanism when the same is in its outward, i.e., alarm set, position. This blockage holds the switch trip lever 155 away from the control cam 40 as shown in Fig. 8c, and in a counterclockwise or switch "off" position. Stated another way, the switch lever 150 is in its switch "off" condition as shown in Fig. 8c and the trip lever 155, by reason of being "hung up" on the trip staff, is ineffective to take over control from the switch lever 150; consequently, the switch remains temporarily off. However, when the alarm mechanism trips at the preset time, drop-off occurs at point 77a on the detent 77 causing the trip staff 70 to move inwardly, which condition is shown in Fig. 9b. With the trip staff thus out of the way of the portion 155c of the lever 155, such lever is free to rotate clockwise under the urging of its biasing spring 156. This causes the bent over tab 155b at the upper end thereof to engage the upper edge of the switch lever 150, thereby moving the switch lever clockwise as shown in Fig. 8d. The latter is accompanied by outward movement of the switch plunger which brings the contacts together, turning on the radio.

In accordance with one of the aspects of the invention, means are provided for defeating or immobilizing the alarm release lever when the control cam 140 is in its "off," "on," or "radio" positions. For this purpose a release lever cam 160 is provided on the shaft 141 of the rotary control cam 140 and a cam follower 66a is provided on the armature release lever 66 previously referred to. The release lever cam 160 is provided with a flat portion 160a which is properly phased on the shaft 141 so that the armature release lever is supported thereon when the control cam is in its "off," "on" and "radio" positions. This locks the buzzer armature in a position away from the pole faces so that sounding of the buzzer alarm is precluded. This will be made clear by reference to Figs. 9a–9c which show the locking out of the buzzer alarm when the control cam is set in the "radio" position. It will be recalled from the above discussion of the buzzer alarm mechanism, that upon the second drop-off of the drop-off gear 73, which follows the first drop-off by about 10 minutes, the conical cam 71 undergoes an additional step of movement thereby freeing the armature release lever 66 and allowing the same, normally, to move into its armature-freeing position. However, in the present device, the second point of drop-off occurs idly as shown in Fig. 9c, with the armature release lever being retained in its buzzer "off" position by reason of the fact that the cam follower portion 66a thereof is supported on the flat surface 160a of the release lever cam. The effect is to insure that the buzzer never sounds except when the control cam 140 is moved into its final or "radio-alarm" position.

Figure 8E:
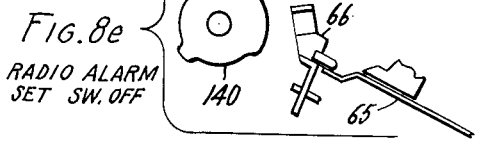
Figure 8B:
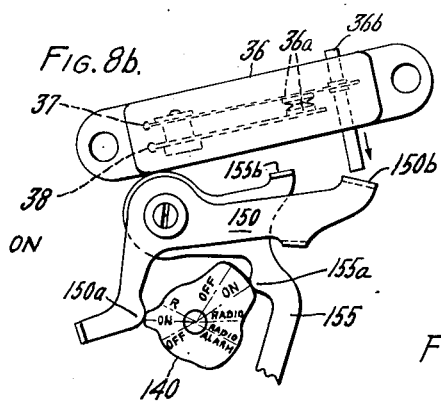
Figure 8F:
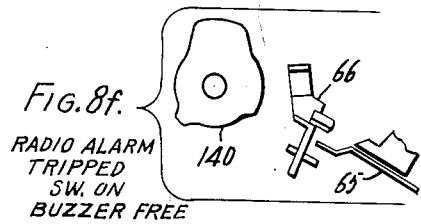
Figure 8C:
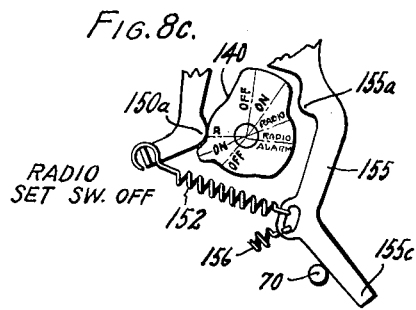
Figure 8D:
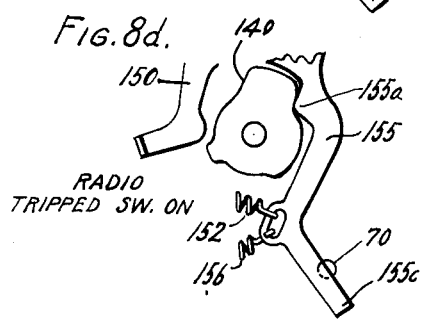

Referring next to Figs. 8e and 8f as well as Figs. 10a–10c, pressing of the radio-alarm plunger 94 causes the slide cam to be moved all of the way to the end, thereby rotating the control cam 140 an additional 30 degrees into the "radio-alarm" position. Such movement does not have any effect upon the levers 150, 155 engaging the control cam, and they remain in the same position as they occupied in the "radio" condition discussed immediately above. However, the additional movement of the release lever cam 160 causes the cam follower 66a on the arm release lever to ride off of the flat portion 160a and downwardly on an inclined portion 160b. In other words, movement to the "radio-alarm" position frees the armature release lever from any supervisory restraint so that the armature release lever is subject to release under the control of the conical cam 71 on the trip staff. Operation under the "radio-alarm" condition will be made clear upon review of Figs. 10a–10c. Assuming that the alarm mechanism has been set, the first drop-off by the drop-off gear 73 has the effect of removing the trip staff 70 from its blocking position relative to the lever 155 so that the radio switch is turned "on." Such movement is not, however, sufficient to free the armature release lever and the latter is blocked in position as shown in Fig. 10b. However, upon the passage of an additional 10 minutes, the second drop-off takes place as shown in Fig. 10c, causing the conical cam to undergo additional movement which frees the armature release lever allowing it to rock counter clockwise out of engagement with the armature turning on the buzzer alarm.

The buzzer alarm and radio will thereafter remain on indefinitely unless turned off. Under normal circumstances, the user will choose to turn the buzzer off but leave the radio on. To accomplish this it is sufficient to press the "on" plunger 92 which causes engagement between the cam follower 132 and the cam surface 122b on the slide cam. The effect is to retract the slide cam in the right-hand direction thereby rotating the control cam 140 to the "on" position illustrated in Fig. 8b. Simultaneously with the rotation of the control cam 140, the release lever cam rotates in the clockwise direction, thus causing the follower on the armature release lever to ride up on the inclined portion 160b onto the flat portion 160a of the release lever cam. The resulting rocking of the armature release lever causes the same to rotate into blocking position relative to the armature, terminating further armature vibration.

Subsequently, when it is desired to turn the radio off the "off" push button plunger 91 is depressed causing the slide cam to be moved additionally to the right into its "off" position accompanied by rotation of the control cam 140. This restores the levers 150, 155 to the position shown in Fig. 5 turning the radio switch off.

*Function indicator*

It is an additional feature of the present construction that novel means are provided for indicating to the user the setting of the mechanism, in other words, indicating which of the push button plungers was last depressed. To understand this feature, attention is particularly directed to Figs. 3, 4 and 11, the latter figure being a simplified perspective showing a portion of the clock dial 30. In accordance with the invention, apertures are provided in the dial, and indicia movable with the slide cam are provided for cooperating with the respective apertures so arranged that only one index is viewable for each position of the slide cam. In the present instance, the apertures 161–164 in the clock dial 30 are vertically alined with respect to cooperating push button plungers 91, 94 respectively so as to be identified therewith. For the purpose of carrying the indicia, a function indicator 170 is provided which is a thin plate of inverted U-shape secured at its ends to the slide cam 110 by riveting or the like so as to extend parallel to and closely adjacent the back of the clock dial 30.

Carried on the face of the function indicator 170 are colored areas 171–174. These colored areas are spaced more closely together than the apertures with which they cooperate, the center-to-center spacing being the same as the valleys 121–124 in the slide cam. When the slide cam is in its left hand or "off" position, the colored area 171 is viewable through the aperture 161. However, when the slide cam moves one step, to the right as shown in Fig. 11, the colored area 172 is alined with the aperture 162 indicating to the user that the radio set is turned on, all of the remaining colored areas being out of register. When the push button plunger 93 is depressed, additional movement of the function indicator occurs, thereby alining the colored area 173 with the aperture 163 and indicating that this function has been selected. An analogous situation exists upon pressing the push button plunger 94. It will be apparent that this mode of indication is positive and easily understood simply by viewing the face of the clock while, nevertheless, being unobtrusive. The vertical alinement of the apertures and push buttons enables a single label to suffice for both. Consequently, it is unnecessary to put any further indication on the upper ends of the push button plungers, keeping the latter neat and unencumbered.

Sleep control

In accordance with a further feature of the invention an additional push button plunger is provided adjacent the "off" plunger for delaying the turning off of the radio for a predetermined time interval, the time interval being settable by incremental pushes on the push button plunger. Thus, where it is desired to delay the turning off of the radio until after the user is asleep, the radio can be caused to play an additional 15 minutes, for example, by pressing the push button plunger 95 through one stroke. If it is desired to make the delay interval a half hour, the plunger 95 is pressed twice and so on up to a total available delay of one hour.

In order to understand the mechanism employed for accomplishing this delay, reference is made to Figs. 4, 6, 12 and 14a–c. Here it will be noted that a delay member 180 is provided in the form of a spring sector formed of two wafers of spring metal having a cut-out portion and a peripherally grooved sector 181 providing a flared entryway. The latter is arranged in alinement with the gear 52 of the timing train but, because of the cut-out portion, it is normally out of engagement with it. In order to turn the radio switch 36 on whenever the spring sector 180 is coupled to the timing train, a cam and lever arrangement is employed comprising a sleep cam 185 and a sleep switch lever 186. The sleep cam 185 is secured to the outer end of the shaft 182 and thus accurately phased with respect to the spring sector 180. The sleep switch lever 186 is centrally pivoted at 187 and provided with a biasing spring 188. In order to cause the sleep switch lever 186 to occupy a counterclockwise or inactive position when the spring sector 180 is disengaged, the sleep cam 185 is formed with a V-notch 185a which receives a cam follower 186a on the lever 186. The cam follower is urged into a bottoming position by the biasing force of the spring 188. For the purpose of engaging the switch 36, the switch lever 150 is provided with an inwardly bent tab 150c which extends laterally into the path of movement of the switch end of the lever 186. Consequently, when the shaft 182 is turned incident to putting the "sleep" function into operation, the other end of the lever 186 is cammed out of the notch in the cam 185 causing the lever 186 to be positively rotated in a counterclockwise direction. This results in engagement between the switch end of the lever 186 and the tab 150c. Such engagement takes over control from the switch lever 150, causing the same to be rotated downwardly and allowing the switch plunger to move outwardly with respect to the switch, closing the contacts and turning on the radio.

To facilitate understanding, the delay member or sector 180 may be considered to be "overlappingly" engaged or coupled to the gear 52 of the timing train. That is to say, the periphery of the spring sector is caused to overlap the periphery of the gear 52, with the degree of overlap determining the delay interval. As the gear turns, the amount of overlap is progressively reduced to the point where the sector is free of the gear.

In accordance with one of the features of the invention, a ratchet mechanism is interposed between the "sleep" plunger 95 and the spring sector 180 so that the latter is advanced into overlapping engagement with the cooperating gear 52 by incremental amounts, one increment for each stroke of the plunger 95. In the preferred embodiment illustrated, a ratchet wheel 190 is mounted at the forward end of the shaft 182 in the path of movement of a pawl secured to the plunger 95. The ratchet wheel includes a series of four ratchet teeth 191–194 inclusive. The pawl, 200, is in the form of an arm having a transversely bent portion 201 and provided to the plunger at a pivot 202. The pawl is biased in the direction of the ratchet wheel by means of a spring 203. Preferably the position of the pawl relative to the ratchet teeth is defined by a surface 204 which comprises (see Fig. 12) one side of an opening formed in the front frame plate of the clock.

The effect of successive pushes on the "sleep" plunger 95 will be apparent upon referring to the stop motion views in Figs. 14a–14c. It will be assumed that the user wishes to have the radio remain on for one-half hour. Prior to setting, the spring sector and ratchet wheel occupy the position shown in Fig. 14a. A first stroke of the plunger causes the pawl 200 to engage the first tooth 191 on the ratchet wheel, causing the ratchet wheel to be rotated clockwise through an angle of approximately 60° to the position shown in Fig. 14b. This is accompanied by rotation of the spring sector 180 into gripping engagement with the gear 52 of the timing train and is also accompanied by rocking of the sleep switch lever 186 in a counterclockwise direction turning the switch 36, and thus the radio, on. When the plunger 95 is released, the pawl 200 clicks idly by the ratchet tooth and upon applying a successive push, the tooth 192 of the ratchet is engaged by the pawl causing the spring sector 180 to be additionally rotated with respect to the gear which it engages. The total rotation of the spring sector caused by two strokes of the plunger is such, with respect to the speed of rotation of the gear 52, as to cause the spring sector to be engaged for one-half hour.

Following expiration of the one-half hour, the spring sector is free of the gear 52 and total disengagement between the two elements is produced by bottoming of the cam follower in the sleep cam 185 under the influence of the biasing spring 188. The resulting clockwise movement of the lever 186 causes the same to be moved upwardly out of engagement with respect to the switch lever 150. The latter is therefore free to move to its counterclockwise or switch "off" position under the influence of its biasing spring 152. It is apparent from the foregoing that in the event a one hour delay were desired rather than a half-hour delay, this could be brought about simply by pressing the "sleep" plunger a total of four times. For convenience in using the sleep control, the notation "15 minutes per stroke" may be placed on the clock dial immediately below and alined with the plunger 95.

In accordance with a still further feature of the invention, the sleep control plunger 95 is placed adjacent the "off" plunger 91 and means coupled to the "off" plunger are provided for wiping out any remaining delay interval when the "off" plunger is pressed. To understand this coupling, reference is made to the additional fragmentary section Fig. 13, as well as to the distorted perspective, Fig. 6. In the preferred embodiment, an auxiliary sector gear 210 is provided which is meshed with the ratchet wheel 190 and which includes an abutment 211 thereon which is engaged by the "off" plunger 91 during the course of its downward stroke. Specifically, the abutment 211 is engaged by the upper edge 212 of a cut-out formed in the central portion of the plunger 91. In use, the user may decide to set the sleep control for a one-half hour delay only to change his mind, desiring that the radio be turned off. In order to turn the radio off the "off" plunger 91 is depressed and, during the course of its downward movement, the surface 212 on the plunger engages the abutment 211 on the auxiliary sector gear 210. This causes the sector gear to be rotated clockwise resulting in counterclockwise rotation of the ratchet wheel 100 and the shaft 182. The friction coupling between the spring sector 180 and the gear 52 is overpowered so that the spring sector rotates in a retrograde or backward direction out of engagement with the gear 52. In addition, restoration of the shaft 182 to its initial position is accompanied by rotation of the sleep cam, bottoming movement of the cam follower 186a therein, and clockwise rotation of the switch arm 186 causing the switch 36 to be turned off.

Subsequently, the user may, if he wishes, press either the "radio" or the "radio-alarm" plungers so that the proper mode of operation is established for the following morning.

While the operation of the device and the flexibility of use which it provides should be apparent from the above discussion, it may be helpful to review some of the features which are inherent in the disclosed construction. The most striking feature about the clock is its simplicity of operation. When used in combination with a radio in the normal way, there are only two control knobs visible, namely, the station selector and the volume control, all of the other functions being accomplished selectively by pressing one of the five push buttons. This is to be contrasted with clocks having a multiplicity of knobs and where considerable care must be taken to see that the clock-controlling knobs are adjusted in just the right position. The positiveness of setting afforded by the present construction insures that the user will be awakened on time which is, after all, the primary reason for a device of this type.

It is also noteworthy, with regard to positiveness of operation, that the plungers are all "full stroke" and oriented to be pressed straight down toward the supporting surface. Thus each of the plungers may be operated with any desired amount of force without displacing the clock on the bed table. Moreover, since all of the push button plungers are readily accessible along the top front edge of the radio cabinet, they may be operated by "feel" in the dark and without getting out of bed. For example, the user may desire to switch from the "radio" to the "radio-alarm" position, or the user may desire, after getting in bed, to employ the "sleep" function. In either event, the setting is a simple operation. The very simplicity adapts the device to use by children who are generally incapable of properly operating a clock radio of more conventional design.

Turning finally to the problem of manufacture, it will be apparent that the device employs a minimum number of parts and that all of the parts and linkages associated with the push buttons are sandwiched in a narrow space on the order of a quarter of an inch provided between the frame plate of the clock and the clock dial. Consequently, the unusual features of the present device are not obtained at the expense of cubic inches of volume. This is particularly important in view of the continuing tendency toward a reduction in size of bedside and personal radios. It is noteworthy also that the novel linkage arrangement between the plungers and the internal clock mechanism enables existing types of time clocks to be employed which are characterized by rotation, rather than translation, of the control cam or other control element.

We claim as our invention:

1. In a clock for controlling a radio or the like, the combination comprising a settable alarm mechanism, switch means for controlling the radio, a switch control mechanism coupled to said switch means and including a cam having (a) an "off" position in which the switch is turned off, (b) an "on" position in which the switch is turned on, and (c) a "radio" position, means for coupling the switch means to the alarm mechanism when the cam is in its "radio" position so that the switch means is conditioned for automatic operation at a selected later time, a slide member coupled to the switch control mechanism and having a rack and pinion connection therewith, a set of push button plungers for the "off," "on," and "radio" functions respectively, and means for coupling said push button plungers to the slide member for moving the slide member to a corresponding and predetermined position when a selected push button plunger is pressed.

2. In a clock for controlling a radio or the like, the combination comprising a settable alarm mechanism, switch means for controlling the radio, a switch control mechanism coupled to said switch means and having a control member movable between an "off" position in which the switch is turned off, (b) an "on" position in which the switch is turned on, and (c) a "radio" position, means for coupling the switch means to the alarm mechanism when the control member is in its "radio" position so that the switch means is conditioned for automatic operation at a selected later time, a slide member coupled to the switch control mechanism, a set of push button plungers for the "off," "on," and "radio" functions respectively, and means including respective cams for coupling said push button plungers to the slide member for moving the slide member to corresponding and predetermined position when a selected push button plunger is pressed.

3. In a clock assembly for controlling a radio or the like, the combination comprising a clock frame having a clock dial parallel to said frame and spaced a short distance therefrom, switch means and a switch control mechanism mounted in said frame for controlling the radio for any one of a plurality of modes of operation, a slide member slidably mounted in the space between said frame and said dial and having a plurality of cooperating plungers terminating in a row of push buttons adjacent to said dial, said slide member being connected to said switch control mechanism and coupled to the plungers so that upon depression of any selected one of said push buttons said slide member is moved to a predetermined position without regard to its previous position for selection of one of said modes of operation.

4. In a clock assembly for controlling a radio or the like, the combination comprising a clock frame having a clock dial parallel to said frame and spaced a short distance therefrom, switch means and a switch control mechanism mounted in said frame for controlling the radio for any one of a plurality of modes of operation, a slide member slidably mounted in the space between said frame and said dial and connected to said switch control mechanism, a plurality of cooperating plungers terminating in a row of push buttons adjacent to said dial, cam means interposed between said plungers and said slide member so that upon depression of any selected one of said push buttons said slide member is moved to a predetermined position without regard to its previous position for selection of one of said modes of operation.

5. In a clock assembly for controlling a radio or the like, the combination comprising a clock frame having a clock dial parallel to said frame and spaced a short distance therefrom, switch means and a switch control mechanism mounted in said frame for controlling the radio for any one of a plurality of modes of operation, a slide member slidably mounted in the space between said frame and said dial and connected to said switch control mechanism and having a plurality of cooperating plungers terminating in a row of push buttons adjacent to said dial, said slide member having a plurality of cam valleys formed on its upper edge and said plungers having cam followers thereon for bottoming in said valleys respectively, the spacing between said valleys being different from the lateral spacing between said cam followers so that upon depression of any selected one of said push buttons said slide mechanism is moved to a predetermined position without regard to its previous position for selection of one of said modes of operation.

6. In a clock assembly for controlling a radio or the like, the combination comprising a clock frame having a clock dial parallel to said frame and spaced a short distance therefrom, switch means and a switch control mechanism mounted in said frame for controlling the radio for any one of a plurality of modes of operation, a slide member slidably mounted in the space between said frame and said dial and having a plurality of cooperating plungers terminating in a row of push buttons adjacent to said dial, said slide member being connected to said switch control mechanism and coupled to the plungers so that upon depression of a selected push button said slide member is moved to a predetermined position for selection of one of said modes of operation, said dial having indicator means coupled to said slide member and alined with the respective push buttons for indicating which of said push buttons has been pressed.

7. In a clock assembly for controlling a radio or the like, the combination comprising a clock driving train, switch means for turning the radio on and off, delay means including a delay member normally disengaged from the driving train but arranged for movement into a position of overlapped engagement with an element of said driving train, with the subsequent retrograde movement of the member to the disengaged position defining a delay interval, a switch operator coupled to the delay member and so arranged that the switch means is turned on during the time that the delay member is engaged but turned off incident to restoration of the delay member to its disengaged position, first and second spring returned plungers having defined limits of movement and arranged adjacent to one another for manual manipulation, a ratchet mechanism connected between said first plunger and said delay member so arranged that each stroke of the plunger causes a predetermined increment in the overlapping movement of the delay member and thus a predetermined increment in the delay interval, and means engageable by said second plunger during its course of movement for overpowering said delay member and for restoring the same to its disengaged position to wipe out the delay.

8. In a clock assembly for controlling a radio or the like, the combination comprising a clock driving train, switch means for controlling a radio, a switch control mechanism including a member movable between a first position in which the switch is turned off and a second position in which the switch is turned on, off and on push button plungers coupled to said member for moving the latter to said positions, an auxiliary switch operator coupled to said switch means, delay means for controlling said auxiliary switch operator including a delay member normally disengaged from the driving train but arranged for movement into a position of overlapped engagement with an element of said driving train, said auxiliary switch operator being connected to the delay member so that the switch means is turned on during the time of engagement with said driving train but turned off incident to the restoration of the delay member to its disengaged position thereby to define a delay interval, a third push button plunger adjacent said off plunger and having a ratchet connection with said delay member so that each stroke of the third plunger causes a predetermined increment in the delay interval, and means arranged in the path of movement of the off push button plunger for restoring the delay member to its disengaged position.

9. In a clock assembly for controlling a radio or the like, the combination comprising a frame, a settable two step alarm mechanism, switch mechanism including a switch for controlling the radio, the switch mechanism having (a) an "off" condition in which the switch means is turned off, (b) an "on" condition in which the switch means is turned on, (c) a "radio" condition in which the switch means is coupled to the alarm mechanism thereby to condition the switch means for operation at the future time for which the alarm mechanism is set and (d) a "radio-alarm" condition in which the switch means is conditioned for operation at said future time followed a short interval later by the sounding of the alarm in the alarm mechanism, said switch mechanism having a movable operator for setting said mechanism for one of said modes of operation, a plurality of plungers arranged for sliding movement in said frame, push buttons on said plungers arranged side by side outwardly of said frame for manual operation of said plungers, and means interposed between said plungers and said movable operator and so arranged that the operator is moved to desired positions corresponding to said modes of operation by pressing one of said push buttons.

10. In a clock assembly for controlling a radio or the like, the combination comprising a frame, a settable two step alarm mechanism, switch mechanism including a switch for cotrolling the radio, the switch mechanism having (a) an "off" condition in which the switch is turned off, (b) an "on" condition in which the switch is turned on, (c) a "radio" condition in which the switch means is coupled to the alarm mechanism thereby to condition the switch means for operation at the future time for which the alarm mechanism is set and (d) a "radio-alarm" condition in which the switch means is conditioned for operation at said future time followed a short interval later by the sounding of the alarm in the alarm mechanism, said switch mechanism having a movable operator for setting said mechanism for one of said modes of operation, a plurality of spring returned plungers corresponding to each of said modes of operation and arranged for sliding movement in said frame, push buttons on said plungers arranged side by side outwardly of said frame for manual operation of said plungers, and means including cam surfaces and cam followers interposed between said plungers and said movable operator and so arranged that the operator is moved to desired positions corresponding to said modes of operation by pressing one of said push buttons.

11. In a clock assembly for controlling a radio or the like, the combination comprising a frame, a settable two step alarm mechanism, switch mechanism including a switch for controlling the radio, the switch mechanism having (a) an "off" condition in which the switch means is turned off, (b) an "on" condition in which the switch means is turned on, (c) a "radio" condition in which the switch means is coupled to the alarm mechanism thereby to condition the switch means for operation at the future time for which the alarm mechanism is set, and (d) a "radio-alarm" condition in which the switch means is conditioned for operation at said future time followed a short interval later by the sounding of the alarm in the alarm mechanism, said switch mechanism having a movable operator for setting said mechanism for one of said modes of operation, a plurality of spring returned plungers corresponding to each of said modes of operation and arranged for sliding movement in said frame, push buttons on said plungers arranged side by side outwardly of said frame for manual operation of said plungers, means including cam surfaces and cam followers interposed between said plungers and said movable operator and so arranged that the operator is moved to desired positions corresponding to said modes of operation by pressing one of said push buttons, indicators alined with each of said push buttons, and means operated by said movable operator for activating the indicator corresponding to the selected push button when such push button is pressed.

12. In a clock assembly for controlling a radio or the like, the combination comprising a frame, a settable two step alarm mechanism, switch mechanism including a switch for controlling the radio, the switch mechanism having (a) an "off" condition in which the switch means is turned off, (b) an "on" condition in which the switch means is turned on, (c) a "radio" condition in which the switch means is coupled to the alarm mechanism thereby to condition the switch means for operation at the future time for which the alarm mechanism is set, and (d) a "radio-alarm" condition in which the switch means is conditioned for operation at said future time followed a short interval later by the sounding of the alarm in the alarm mechanism, said switch mechanism having a movable operator for setting said mechanism for one of said modes of operation, a plurality of spring returned plungers corresponding to each of said modes of operation and arranged for sliding movement in said frame, push buttons on said plungers arranged side by side outwardly of said frame for manual operation of said plungers, means including cam surfaces and cam followers interposed between said plungers and said movable operator and so arranged that the operator is moved to desired positions corresponding to said modes of operation by pressing one of said push buttons, means including an auxiliary switch operator for delaying the turning off of the radio switch until passage of a desired time interval, and an additional plunger having a push button arranged adjacent to said plurality of push buttons for activating said delay means.

13. In a clock assembly for controlling a radio or the like, the combination comprising a clock frame, a clock dial parallel to said frame and spaced a short distance therefrom, a switch, a switch control mechanism mounted in said frame for causing the switch to be operated in accordance with any one of a plurality of modes of operation, a slide member slidably mounted in the space between said frame and said dial and having a plurality of cooperating plungers terminating in a row of push buttons adjacent said dial, means including cam surfaces and cam followers interposed between said plungers and said slide member for causing said slide member to be moved to a predetermined selected position incident to the pressing of a selected one of said push buttons, apertures in said dial alined with said push buttons respectively, said slide member having a display member arranged behind said dial, said display member having a series of indicia thereon so arranged that upon pressing one of said push buttons, the corresponding movement of the display member causes one of said indicia to be viewable through the aperture associated with the associated push button thereby to indicate the particular push button which has been depressed and, consequently, the mode of operation for which the device is set.

References Cited in the file of this patent

UNITED STATES PATENTS

| | | |
|---|---|---|
| 1,489,580 | Lucey | Apr. 8, 1924 |
| 2,374,946 | Morris | May 1, 1945 |
| 2,414,835 | Regensteiner et al. | June 28, 1947 |
| 2,505,573 | Prophet | Apr. 25, 1950 |
| 2,533,477 | Laschenski | Dec. 12, 1950 |
| 2,561,187 | Elliott | July 17, 1951 |
| 2,578,503 | Burrichter | Dec. 11, 1951 |
| 2,721,441 | Boyles | Oct. 25, 1955 |